(12) United States Patent
Piehler

(10) Patent No.: US 6,896,374 B2
(45) Date of Patent: May 24, 2005

(54) PROJECTION ARRANGEMENT

(75) Inventor: Erberhard Piehler, Lehesten (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/479,935

(22) PCT Filed: Jun. 4, 2002

(86) PCT No.: PCT/EP02/06125

§ 371 (c)(1),
(2), (4) Date: Dec. 5, 2003

(87) PCT Pub. No.: WO02/100099

PCT Pub. Date: Dec. 12, 2002

(65) Prior Publication Data

US 2004/0169830 A1 Sep. 2, 2004

(30) Foreign Application Priority Data

Jun. 7, 2001 (DE) .......................... 101 27 617

(51) Int. Cl.⁷ .......................... G03B 21/28; G03B 21/00
(52) U.S. Cl. ............................ 353/37; 353/98; 353/122
(58) Field of Search .................... 348/774, 755, 348/756, 781–784, 771; 353/98, 37, 50, 51, 99, 102; 359/726–736, 798, 800; 349/57, 62, 8, 9

(56) References Cited

U.S. PATENT DOCUMENTS

| 1,629,192 | A | * | 5/1927 | Winzenburg et al. ....... 352/136 |
| 2,742,817 | A | | 4/1956 | Altman |
| 4,861,142 | A | | 8/1989 | Tanaka et al. |
| 5,032,021 | A | | 7/1991 | Kanatani et al. |
| 5,300,942 | A | | 4/1994 | Dolgoff |
| 5,580,146 | A | | 12/1996 | Maslow |
| 5,633,755 | A | | 5/1997 | Manabe et al. |

(Continued)

FOREIGN PATENT DOCUMENTS

| DE | 198 32 317 C 1 | 7/1998 |
| DE | 199 07 345 A1 | 9/2000 |
| DE | 199 63 312 A1 | 9/2000 |
| EP | 0 734 183 A2 | 9/1996 |
| EP | 1 024 395 A2 | 8/2000 |

(Continued)

OTHER PUBLICATIONS

International Search Report.
"Novel Optical System Design for Reflective CMOS Technology," S–Vision Inc., 2441 Mission College Boulevard, Santa Clara, CA 95454 (5 pgs.).
"Harness the Brilliance of LCoS," Mitsui & Co., Ltd. (2 pgs.).
"Compact Projection Optics for Dual DMD Projectors," J. Brian Caldwell. Dara Blitz–Taskale, Projectavision, Inc., New York.

Primary Examiner—Judy Nguyen
Assistant Examiner—Andrew Sever
(74) Attorney, Agent, or Firm—Patterson, Thuente, Skaar & Christensen, P.A.

(57) ABSTRACT

In a projection arrangement comprising a light source (1) for generating a luminous field (2), a reflecting light modulator (4; 27) onto which light coming from the luminous field (2) may be directed, said light being modulated by the light modulator (4; 27) in order to generate an image, and further comprising projection optics (5; 21, 32), arranged following the light modulator, for projecting said image, the projection optics (5; 21, 32) comprise imaging optics (5; 21) including a mirror (9; 25) and a lens (6; 7; 8; 22; 23; 24) arranged between the light modulator (4; 27) and the mirror (9; 25), the light coming from the light modulator (4; 27) and reflected by the mirror (9; 25) passing twice through the lens (6; 7; 8; 22; 23; 24) and the light coming from the luminous field (2), which is directed onto the light modulator (4; 27), passing through the lens (6; 7; 8; 22; 23, 24) of the imaging optics (5; 21) only once.

23 Claims, 3 Drawing Sheets

U.S. PATENT DOCUMENTS

| | | | |
|---|---|---|---|
| 5,900,982 A | | 5/1999 | Dolgoff et al. |
| 5,949,503 A | * | 9/1999 | Koyama et al. ............... 349/41 |
| 5,978,136 A | | 11/1999 | Ogawa et al. |
| 6,120,152 A | | 9/2000 | Nakayama et al. |
| 6,336,724 B1 | | 1/2002 | Shouji et al. |
| 6,439,726 B1 | | 8/2002 | Piehler |
| 6,609,798 B1 | * | 8/2003 | Milinusic et al. .............. 353/98 |
| 6,688,748 B2 | * | 2/2004 | Lewis et al. .................... 353/69 |

FOREIGN PATENT DOCUMENTS

| | | |
|---|---|---|
| EP | 1 033 614 A2 | 9/2000 |
| EP | 1 039 784 A1 | 9/2000 |
| EP | 1 043 620 A2 | 10/2000 |
| EP | 1 052 856 A2 | 11/2000 |
| EP | 1 055 944 A1 | 11/2000 |
| EP | 1 055 954 A1 | 11/2000 |
| EP | 1 055 955 A2 | 11/2000 |
| EP | 1 056 071 A1 | 11/2000 |
| WO | WO 98/35264 | 8/1998 |
| WO | WO 99/19758 | 4/1999 |
| WO | WO 99/26103 | 5/1999 |
| WO | WO 99/27410 | 6/1999 |
| WO | WO 00/31579 | 6/2000 |
| WO | WO 00/36470 | 6/2000 |

* cited by examiner

PROJECTION ARRANGEMENT

FIELD OF THE INVENTION

The invention relates to a projection arrangement comprising a light source for generating a luminous field, a light modulator onto which light coming from the luminous field may be directed, said light being modulated by the light modulator in order to generate an image, and further comprising projection optics arranged following the light modulator for projecting said image.

BACKGROUND

A projection arrangement of this type is known, for example from DE 198 32 317 B1; in said projection arrangement, however, the light coming from the luminous field is deflected by means of a prism so as to illuminate the light modulator. For this purpose, the prism needs to be located very close to the optical elements of the projection optics, which makes the structure, in particular the support of the individual optical elements, very difficult to realize. Further, said projection optics require a multiplicity of lenses, resulting in complex manufacture and in a heavy weight of the arrangement.

In view thereof, it is an object of the invention to improve a projection arrangement of the aforementioned type such that its structure is simplified.

SUMMARY OF THE INVENTION

In a projection arrangement of the aforementioned type, said object is achieved in that the projection optics comprise imaging optics having a mirror and at least one lens arranged between the light modulator and the mirror, wherein the light coming from the light modulator and reflected by the mirror passes twice through said at least one lens and wherein the light coming from the luminous field and directed onto the light modulator passes only once through said at least one lens of the imaging optics. The imaging optics may comprise one or even several lenses.

Since the light which comes from the light modulator and is incident on the mirror passes twice through the at least one lens of the imaging optics, the number of lenses in the projection arrangement according to the invention is reduced. This has the advantage that the weight of the projection optics is reduced and also that the manufacture of the projection arrangement according to the invention can be effected more quickly and more economically.

Furthermore, the folding of the optical path in the imaging optics due to the mirror also leads to a reduced expanse of the imaging optics along their optical axis, thus also allowing the projection arrangement according to the invention to be realized in a more compact manner.

Because the at least one lens, through which the light coming from the luminous field passes, images the luminous field onto the light modulator or at least contributes to said imaging, the number of optical elements required for illumination of the light modulator decreases, thus enabling a further reduction in the number of optical elements in the projection arrangement according to the invention, which leads to a reduction in weight and to lower costs.

In a preferred embodiment of the projection arrangement according to the invention, the imaging optics are provided as 1:1 imaging optics. This has the advantageous effect that a small image having the same size as the imaging area of the light modulator may be generated by means of the imaging optics. Also, in 1:1 imaging optics, the imaging properties of the curved mirror are particularly good.

In particular, the imaging optics of the projection arrangement according to the invention may be symmetrical with regard to the mirror. This leads to the very important advantage that the lateral chromatic aberration is practically zero and thus not present.

In an advantageous embodiment of the projection arrangement according to the invention, the mirror of the imaging optics is curved. Providing the imaging optics with the curved mirror, which folds the optical path in the imaging optics, allows the light coming from the luminous field to reach the light modulator, without deflection by means of a prism, through the at least one lens of the imaging optics, so that, on the one hand, a further reduction in the number of optical components is made possible and, on the other hand, the dimension of the arrangement according to the invention can be reduced.

Since the mirror of the imaging optics of the projection arrangement according to the invention is curved, it causes not only folding of the optical path in the imaging optics, but also contributes to the imaging of the imaging area of the light modulator, thus enabling a further reduction in the number of lenses arranged between the mirror and the light modulator. Thus, for example, imaging optics comprising only three lenses and a curved mirror have excellent imaging properties, which can be achieved in imaging optics without a curved mirror only by a much greater number of lenses.

The mirror of the imaging optics in the projection arrangement according to the invention preferably has a spherical curvature. In this case, manufacture of the mirror is easily possible, providing economical imaging optics and, thus, also an economical projection arrangement.

An advantageous embodiment of the projection arrangement according to the invention consists in that illumination optics are arranged between the luminous field and the imaging optics and are designed such that the luminous field is imaged onto the light modulator via the illumination optics and the at least one lens of the imaging optics. Thus, the at least one lens of the imaging optics is advantageously used also as the lens of the illumination optics, so that the number of optical elements of the illumination optics may be reduced. This leads to smaller and lighter illumination optics and also has the advantage that it is more economical as a result.

In particular, the light coming from the illumination optics may be coupled into the imaging optics directly (without deflection), so that advantageously no deflecting elements are required and the projection arrangement can be realized in a compact manner.

In a preferred embodiment of the projection arrangement according to the invention, the imaging optics comprise an optical axis, the light modulator is arranged below an imaginary reference plane, in which said optical axis extends, and the image generated by the imaging optics is generated above the reference plane. In doing so, the imaging area of the light modulator is preferably arranged symmetrically, with regard to the reference plane, relative to the image imaged by the imaging optics, so that the optical path of the modulated light reflected by the light modulator also extends through the imaging optics symmetrically relative to said reference plane, which ensures excellent imaging properties.

An advantageous embodiment of the arrangement according to the invention consists in that the luminous field and, thus, also the illumination optics may be located either above or below the reference plane. Thus, the luminous field and the illumination optics may be arranged, depending on further general conditions, e.g. the given dimensions of the housing of the projection arrangement according to the invention, such that the projection arrangement according to the invention may be designed to be very flexible in its spatial arrangement.

Moreover, the light modulator of the projection arrangement according to the invention may be a tilting mirror matrix. Such a tilting mirror matrix may comprise, for example, a multiplicity of tilting mirrors arranged in lines and columns which are independently tiltable into first and second positions, wherein, in the case of the arrangement according to the invention, the light reflected by the tilting mirrors in the first position (bright image points) impinges on the curved mirror and the light reflected by the tilting mirrors in the second position (dark image points) does not impinge on the curved mirror, but travels past it, or is cut off before. This allows the invididual image points to be brightened or darkened, so that the light reflected by the tilting mirror matrix is modulated and, thus, the desired image may be generated, in this sense, on the tilting mirror matrix (the light for the brightened and for the darkened image points is reflected or radiated by the tilting mirror matrix in different directions). Since the tilting mirror matrix reflects the entire light impinging on the corresponding tilting mirrors for the brightened image points, a very bright image may be generated with few losses due to the light modulator.

It is also possible to direct different colors, such as red, green and blue, onto the light modulator in a time-sequential manner, so that the light modulator allows to generate partial color images, which are rapidly projected in succession, so that a multi-color image is perceivable. In order to generate the different colors, a known color wheel may be used, upon which light from the light source is directed and which, due to different color filters of the color wheel, transmits only light of the desired color according to its rotary position.

Further, the projection arrangement according to the invention may be embodied such that the light source emits multicolor light, that a color unit is arranged between the imaging optics and the light modulator and that a second light modulator is arranged following the color unit, wherein it is possible to direct light from the luminous field onto the color unit via the imaging optics from which the color unit couples out light of a first color and directs it onto the first light modulator and couples out light of a second color and directs it onto the second light modulator, wherein the light modulators modulate the light impinging on them in order to generate one partial color image each, and wherein the modulated light is superimposed by the color unit to form one common beam and is guided to the imaging optics. The imaging optics image the superimposed partial color images together, so that, advantageously, a color image may be generated.

In particular, a third light modulator, arranged following the color unit, may be additionally provided in the projection arrangement according to the invention, wherein the color unit couples light of a third color out of the light which is incident on it and directs said light onto the third light modulator, which modulates the light incident thereon, so as to generate a third partial color image, and wherein the light modulated by the third light modulator is superimposed, by means of the color unit, on the light modulated by the other light modulators to form one common beam. Providing three light modulators allows three partial color images of different colors to be generated, so that the imaged multicolor image may contain any desired colors. Further, a high brilliance of colors is easy to realize as well. In this case, it is particularly preferable if a red partial color image may be generated using the first light modulator, a green partial color image may be generated using the second light modulator and a blue partial color image may be generated using the third light modulator.

A preferred embodiment of the projection arrangement according to the invention consists in that the projection optics further comprise a projection unit arranged following the imaging optics, said projection unit, together with the imaging optics, projecting the image generated by means of the light modulator onto a projection surface. In this case, the imaging optics generate a real intermediate image, which is then projected onto the projection surface by means of the projection unit. Since the projection unit may be arranged immediately following the generated real intermediate image, the required intercept distance of the projection unit is very small, so that its structure may be simple.

Furthermore, the projection unit may also be designed and conceived to be completely independent from the imaging optics, because it has to image the real intermediate image, and not the image generated on the light modulator(s) nor the imaging areas of the light modulators, onto the projection surface.

Thus, in the projection arrangement according to the invention, an adaptation to different applications, such as a wide-angle projection or a projection wherein the optical axis of the projection unit intersects the projection surface at an angle which does not equal 90°, may be very easily realized by providing one projection unit each adapted to the respective application.

If the imaging optics are 1:1 imaging optics or also reducing imaging optics, the real intermediate image generated is very small, allowing the lens diameter of the lenses in the projection unit to be kept small, too. Advantageously, this leads to a very compact light projection unit.

The projection arrangement according to the invention may also be embodied such that the projection optics only comprise the imaging optics. In this case, an extremely compact projection arrangement is provided, using which, preferably, 1:1 imaging of an image generated on a light modulator or of the imaging area of said light modulator may be realized.

A reflective LCD module may also be used as the light modulator, in which case linearly polarized light of a first polarization direction is directed onto the light modulator. The LCD module comprises a multiplicity of image pixels, which are independently controllable and leave the polarization direction of the light reflected by them unchanged or turn it by 90°. Therefore, an analyzer is further provided, through which the light reflected by the LCD module has to pass and which transmits only linearly polarized light of a predetermined polarization direction to the intermediate image, so that the polarization-modulated image, which is adjusted on the LCD module, is divided by the analyzer into brightened and darkened image points.

In the projection arrangement according to the invention, there is also preferably provided a control unit which controls the light modulator(s) on the basis of predetermined image data so as to modulate the light incident on the light modulator(s) accordingly and thus generate the corresponding images.

BRIEF DESCRIPTION OF THE DRAWINGS

The invention will be explained in more detail below, by way of example, with reference to the drawings, wherein.

DETAILED DESCRIPTION OF THE INVENTION

Figure 1:
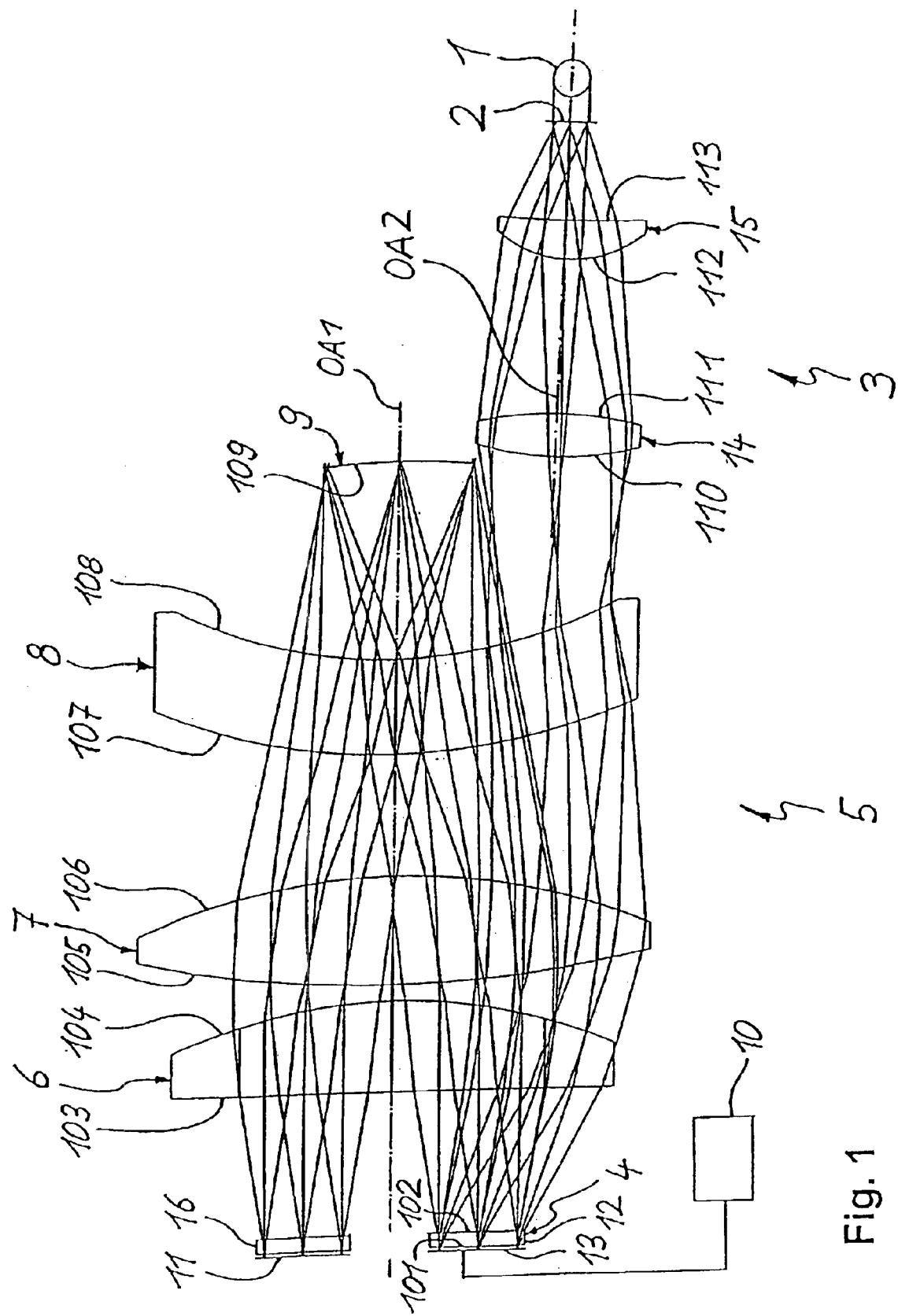
FIG. 1 shows a sectional view of a first embodiment of the projection arrangement according to the invention.

As is evident from FIG. 1, the projection arrangement of the invention, according to the first embodiment, comprises a light source 1, which preferably emits white light by means of which a luminous field 2 may be generated, illumination optics 3 arranged following the luminous field 2 for directing the light coming from the luminous field 2 onto the light modulator 4, and imaging optics 5 arranged between the illumination optics 3 and the light modulator 4.

The imaging optics 5 comprise three lenses 6, 7 and 8 and a curved mirror 9 and serve to image an image generated on the light modulator 4 under the control of a control unit 10 on the basis of predetermined image data into an image plane 11.

The light modulator 4 contains a cover glass 12 and a tilting mirror matrix 13 arranged behind the latter, said tilting mirror matrix 13 comprising a plurality of tilting mirrors arranged in lines and columns, which may be tilted at least from a first to a second tilted position independently of each other. In the embodiment shown, the projection arrangement is designed such that light reflected by the tilting mirrors being in the first position impinges on the curved mirror 9, while light reflected by the tilting mirrors being in the second position is guided around the curved mirror 9. Thus, the tilting mirrors in the first tilted position allow to generate brightened image points and the tilting mirrors in the second tilted position allow to generate darkened image points. Accordingly, the light reflected by the tilting mirror matrix is modulated in terms of the angle of reflection of the light bundles coming from the tilting mirrors and, in this sense, an image is generated on the tilting mirror matrix, said image being imaged into the image plane 11, which may be an intermediate image plane or also a projection surface, by means of the imaging optics 5.

By way of example, FIG. 1 shows optical paths of the light coming from the luminous field 2, presuming that said light is reflected by the corresponding tilting mirrors of the tilting mirror matrix 13 in such a way that it impinges on the curved mirror 9 (light of the brightened image points).

As is evident from FIG. 1, the light coming from the luminous field 2 passes through the illumination optics 3, which comprise first and second lenses 14, 15, and then through the lenses 8, 7 and 6 of the imaging optics 5, and then impinges on the tilting mirror matrix 13 after having passed through the cover glass 12. The incident light is reflected by the tilting minor matrix 13 and passes through the lenses 6, 7 and 8 again, and impinges on the curved mirror 9, which reflects the light such that it passes through the lenses 8, 7 and 6 again and a real image of the image on the tilting mirror matrix is generated in the image plane 11. Thus, the optical path in the imaging optics 5 is Z-shaped. A cover glass 16 is arranged in front of the image plane 11 so that the imaging effected by the imaging optics 5, which, in this case, is 1:1 imaging optics, is symmetrical.

The exact design of the imaging optics 5 is evident from Table 1 below, wherein D is the distance between the corresponding effective surfaces (along the optical axis OA1), n is the refractive index and is the Abbe dispersion number:

TABLE 1

| Surface number | Radius of curvature (mm) | between the surfaces | D (mm) | n | v |
|---|---|---|---|---|---|
| 13 | ∞ | 13–101 | 0.76 | 1.000000 | |
| 101 | ∞ | 101–102 | 3.00 | 1.489144 | 70.23 |
| 102 | ∞ | 102–103 | 29.64 | 1.000000 | |
| 103 | ∞ | 103–104 | 19.00 | 1.489144 | 70.23 |
| 104 | −111.67618 | 104–105 | 3.53 | 1.000000 | |
| 105 | 237.40174 | 105–106 | 22.53 | 1.489144 | 70.23 |
| 106 | −131.61016 | 106–107 | 25.35 | 1.000000 | |
| 107 | 124.28582 | 107–108 | 20.00 | 1.624081 | 36.11 |
| 108 | 96.40134 | 108–109 | 41.66 | 1.000000 | |
| 109 | −161.74108 | | | | |

The tilting mirror matrix 13 and the image plane 11 are located in a common plane, which is perpendicular to the optical axis QA1. The same goes for the surface 101 of the cover glass 12 and for the surface of the cover glass 16 facing the image plane 11, as well as for the surface 102 and the surface of the cover glass 16 turned away from the image plane 11. Therefore, the distance D in the above Table 1 for the surfaces 13, 101 and 102 is always the distance of the points of intersection of the corresponding planes with the optical axis QA1.

The design of the illumination optics 3 is evident from Table 2 below, wherein the lens vertex of the effective surface 110 of the lens 14 is located, relative to the vertex of the mirror 9, on a vertical line passing through the vertex of the mirror 9 to the optical axis OA1 of the imaging optics 5, and the distance from the lens vertex of the effective surface 110 to the optical axis OA1 of the imaging optics 5 is 32.42 mm. Further, the optical axis OA2 of the illumination optics 3 is inclined at 2.8° relative to the optical axis OA1 of the imaging optics 5 (in this case, D refers to the distance along the optical axis OA2).

TABLE 2

| Surface number | Radius of curvature | between the surfaces | D (mm) | n | v |
|---|---|---|---|---|---|
| 110 | 59.75744 | 110–111 | 9.00 | 1.518251 | 63.9 |
| 111 | −77.70133 | 111–112 | 32.36 | 1.000000 | |
| 112 | 23.54345 | 112–113 | 8.10 | 1.518251 | 63.9 |
| 113 | 230.44082 | 113–2 | 20.47 | 1.000000 | |

Figure 2:
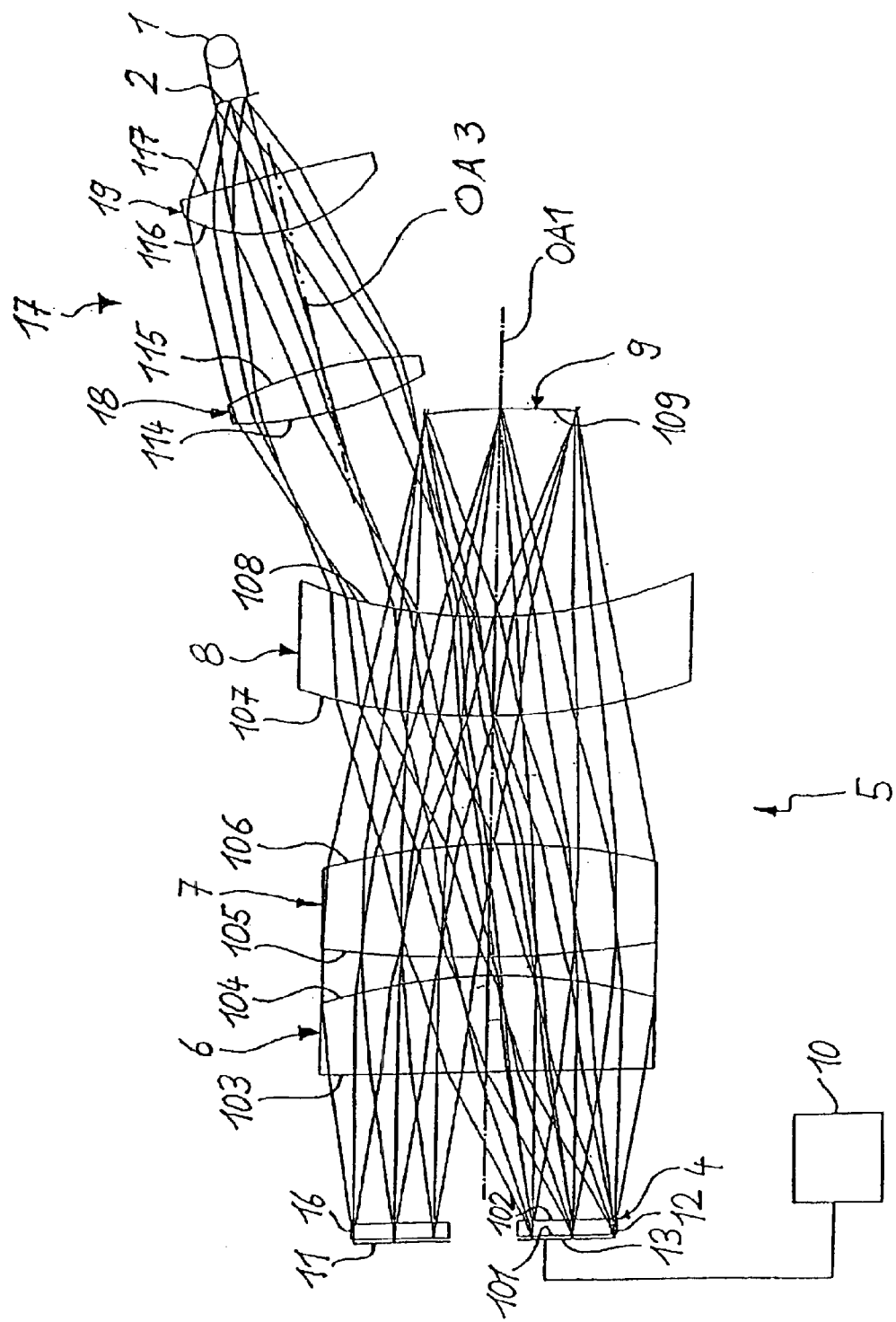
FIG. 2 shows a sectional view of a second embodiment of the projection arrangement according to the invention.

FIG. 2 shows a modification of the projection arrangement according to the invention as shown in FIG. 1, wherein the illumination optics 17, as viewed in FIG. 2, are now arranged above the optical axis OA1 of the imaging optics 5, in contrast to the embodiment of FIG. 1, while the light modulator 4, as viewed in FIG. 2, is located below the optical axis OA1, so that light coming from the luminous field 2 passes through the lenses 8, 7 and 6 of the imaging optics 5 and, in doing so, crosses the optical axis OA1 of the imaging optics 5.

Due to the position of the illumination optics 17 relative to the imaging optics 5 and to the light modulator 4, the required lens diameter of the lenses 6 to 8 of the imaging optics 5 is smaller, as is evident, for example, from a comparison of FIGS. 1 and 2, thus enabling a further weight reduction.

In the embodiment shown in FIG. 2, identical elements are denoted by the same reference numerals as in FIG. 1 and for description thereof, reference is made to the corresponding description of FIG. 1.

Except for the lens diameter in the imaging optics 5 of FIG. 2, the optical elements are identical with those of the imaging optics 5 shown in FIG. 1; therefore, in connection with the structure of the imaging optics shown in FIG. 5, reference is made to Table 1. The structure of the illumination optics 17 is evident from Table 3 below, wherein the lens vertex of the effective surface 114 of the lens 18 is located on a line passing through the vertex of the mirror 9 perpendicular to the optical axis QA1 of the imaging optics 5, and the distance from the lens vertex of the effective surface 114 to the optical axis QA1 is 33.35 mm. Further, the optical axis OA3 of the illumination optics 17 is inclined at 14° relative to the optical axis QA1 of the imaging optics 5 (in this case, D refers to the distance along the optical axis OA3).

TABLE 3

| Surface number | Radius of curvature | between the surfaces | D (mm) | n | v |
|---|---|---|---|---|---|
| 114 | 70.63460 | 114–115 | 8.80 | 1.612602 | 61.02 |
| 115 | −71.78678 | 115–116 | 28.59 | 1.000000 | |
| 116 | 27.96607 | 116–117 | 11.40 | 1.612602 | 61.02 |
| 117 | −499.90085 | 117-2 | 16.42 | 1.000000 | |

Figure 3:
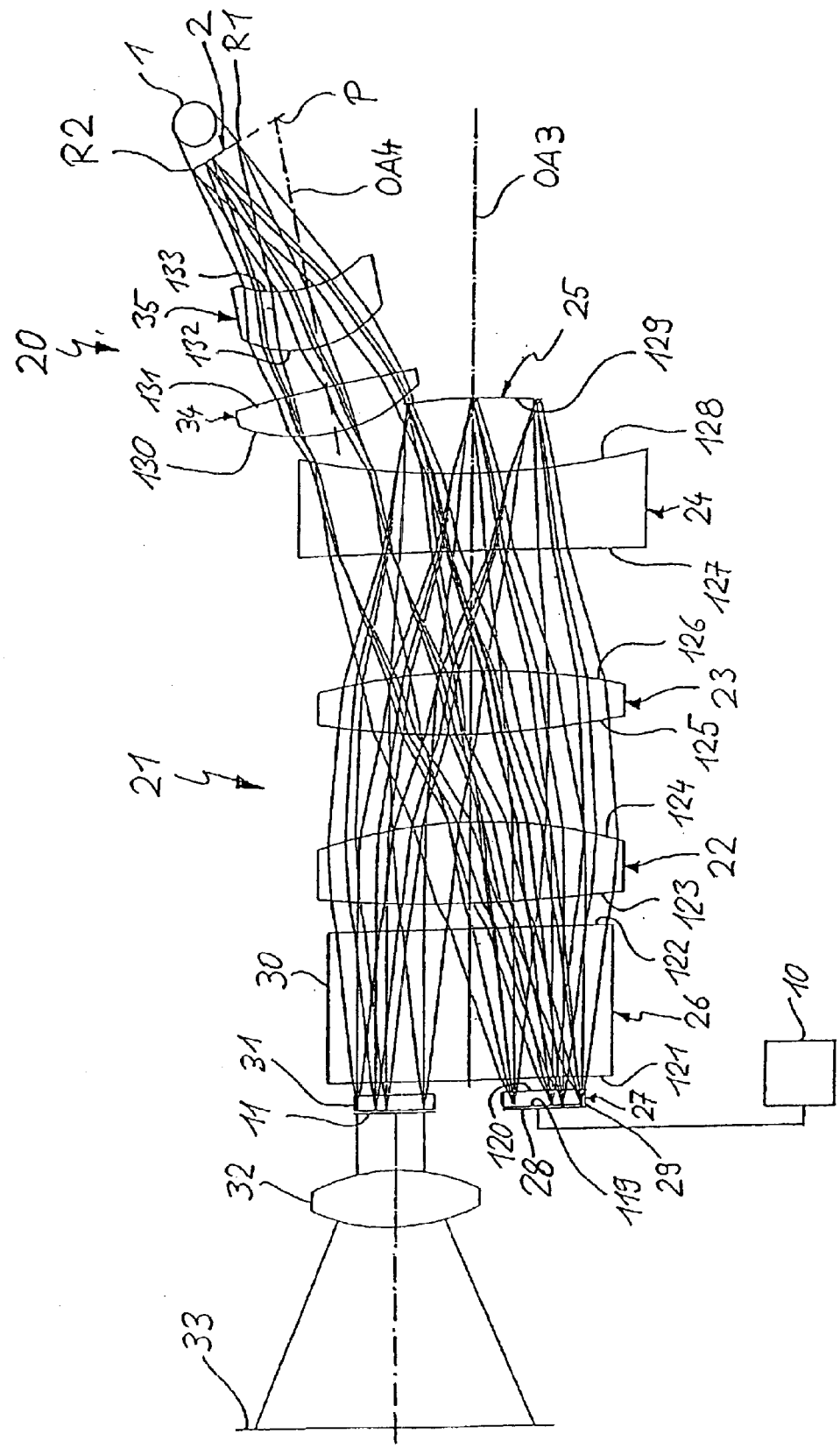
FIG. 3 shows a sectional view of a third embodiment of the projection arrangement according to the invention.

FIG. 3 shows a further embodiment of the projection arrangement according to the invention, which again comprises a light source 1, preferably emitting white light by means of which a luminous field 2 is generated, illumination optics 20, and imaging optics 21 arranged following the illumination optics 20, said imaging optics 21 comprising lenses 22, 23, 24 and a curved mirror 25. The 1:1 imaging optics 21 are followed by a color unit 26, which divides the white light incident thereon into its red, green and blue components, with the green color component, as viewed in FIG. 1, passing through the color unit 26 to the left and impinging on a light modulator 27 arranged there, and the red and blue components each being deflected perpendicular to the drawing plane (once into the drawing plane and once out of the drawing plane) and impinging on correspondingly provided light modulators (not shown). Each of said light modulators 27 is a tilting mirror matrix 28 with a cover glass 29 applied thereon.

The light modulators 27 modulate the light impinging on them such that one partial color image each is generated on the three light modulators, the modulated light being reflected back to the color unit 26, by which it is superimposed to form one common beam which impinges on the imaging optics 21 and, in doing so, passes through the lenses 22 to 24, is reflected by the curved mirror 25 and, again, passes through the lenses 24 to 22, and then impinges on a glass block 30 and a glass plate 31 arranged following the lens 22, and passes through them, so that a real color image of the superimposed partial color images from the light modulators 27 is generated in the image plane 11 following the glass plate. A projection unit 32, which projects the real image generated in the image plane 11 onto a projection surface 33, is arranged following the image plane 11.

In the embodiment shown in FIG. 3, the light modulators 27 (of which only one is shown in the Figure) are also arranged such that the light reflected by the tilting mirrors in the first position impinges on the mirror 25 and is, thus, used for the brightened image points, whereas the light reflected by the tilting mirrors in the second position is passed around the mirror 25, thus allowing to adjust the darkened image points.

Instead of the glass block 30 and the glass plate 31, which are provided so that the optical path length from the light modulator 27 to the mirror 25 equals the optical path length from the mirror 25 to the intermediate image plane 11, there may also be provided a deflecting prism, in turn followed by the projection unit 32, so that projection is effected in another (freely selectable) direction.

The exact structure of the imaging optics 21 and of the illumination optics 20, comprising the lenses 34 and 35, is shown in Tables 4 and 5 below.

The illumination optics 20 are arranged such that the distance from the vertex of the effective surface 130 to the lens 34 perpendicular to the optical axis OA3 of the imaging optics 21 is 27.113 mm and is offset by 6.0 mm in the direction toward the light modulator 27, relative to the vertex of the mirror 25, along the optical axis OA3 of the imaging optics 21, with the optical axis OA4 of the illumination optics 20 being inclined at 11.87° relative to the optical axis OA3 of the imaging optics 21.

Tables 4 and 5 show the distances D along the corresponding optical axes, indicating, as regards the surfaces 133-2, the distance from the surface 133 to the point of intersection P of an imaginary extension of the surface 2, shown as a dashed line in FIG. 3, with the optical axis OA4. In this case, the surface 2 is tilted at 18° relative to a normal to the optical axis OA4, with the distance of the edge points R1 and R2 of the surface 2 (FIG. 3) perpendicular to the optical axis OA4 being 7.32 mm and 17.62 mm.

TABLE 4

| Surface number | Radius of curvature (mm) | between the surfaces | D (mm) | n | v |
|---|---|---|---|---|---|
| 28 | ∞ | 13–119 | 0.5 | 1.000000 | |
| 119 | ∞ | 119–120 | 3.00 | 1.510452 | 60.98 |
| 120 | ∞ | 120–121 | 2.54 | 1.000000 | |
| 121 | ∞ | 121–122 | 30.00 | 1.518722 | 63.96 |
| 122 | ∞ | 122–123 | 5.00 | 1.000000 | |
| 123 | 289.85 | 123–124 | 16.00 | 1.655687 | 44.67 |
| 124 | −97.579 | 124–125 | 17.11 | 1.000000 | |
| 125 | 176.861 | 125–126 | 12.30 | 1.518722 | 63.96 |
| 126 | −132.09 | 126–127 | 24.22 | 1.000000 | |
| 127 | −1112.0 | 127–128 | 15.00 | 1.550987 | 45.47 |
| 128 | 155.641 | 128–129 | 14.76 | 1.000000 | |
| 129 | −128.878 | | | | |

TABLE 5

| Surface number | Radius of curvature | between the surfaces | D (mm) | n | v |
|---|---|---|---|---|---|
| 130 | 31.823 | 130–131 | 9.10 | 1.489144 | 70.23 |
| 131 | −430.7 | 131–132 | 9.00 | 1.000000 | |
| 132 | 21.803 | 132–133 | 12.00 | 1.591424 | 61.02 |
| 133 | 28.717 | 133-2 | 33.68 | 1.000000 | |

The color unit 26 shown in FIG. 3, which comprises 3 light modulators, may, of course, be used also in the embodiments shown in FIGS. 1 and 2 in order to generate color images in the image plane 11. Further, it is also possible, according to the embodiments shown in FIGS. 1 and 2, to arrange respective projection optics following the image plane 11, so that the image plane 11 is an intermediate image plane in which a real intermediate image is generated, which is then imaged (in enlarged or reduced form) onto a projection surface by means of the projection optics.

What is claimed is:

1. A projection arrangement comprising:
   a light source generating a luminous field;
   a reflecting first light modulator onto which light from the luminous field may be directed, said light being modulated by the first light modulator to generate an image;

the projection arrangement further comprising projection optics, for projecting said image, wherein the projection optics comprise imaging optics including a mirror and a lens arranged between the first light modulator and the mirror, the light coming from the first light modulator and reflected by the mirror, passing twice through the lens and the light coming from the luminous field, which is directed onto the first light modulator, passing through the lens of the imaging optics only once.

2. The projection arrangement as claimed in claim 1, wherein the imaging optics are 1:1 imaging optics.

3. The projection arrangement as claimed in claim 1, wherein the imaging optics are symmetrical with respect to the mirror.

4. The projection arrangement as claimed in claim 1, wherein the mirror of the imaging optics is curved.

5. The projection arrangement as claimed in claim 3, wherein the mirror of the imaging optics is curved.

6. The projection arrangement as claimed in claim 4, wherein the mirror has a spherical curvature.

7. The projection arrangement as claimed in claim 5, wherein the mirror has a spherical curvature.

8. The projection arrangement as claimed in claim 1, further comprising illumination optics between the luminous field and the lens of the imaging optics, the illumination optics being such that the luminous field is imaged onto the first light modulator via the illumination optics and the lens of the imaging optics.

9. The projection arrangement as claimed in claim 8, wherein the imaging optics comprise an optical axis and the first light modulator is located on one side of a reference plane through which said optical axis extends, and the image imaged by the imaging optics is located on an opposing side of said reference plane.

10. The projection arrangement as claimed in claim 9, wherein the luminous field is located on the same side of the reference plane as the image of the first light modulator.

11. The projection arrangement as claimed in claim 1, wherein the first light modulator comprises a tilting mirror matrix.

12. The projection arrangement as claimed in claim 1, wherein the light source emits multicolor light and the projection arrangement further comprises:

a color unit arranged between the imaging optics and the light modulator, a second light modulator arranged following the color unit, wherein light is directable from the luminous field onto the color unit via the imaging optics and the color unit separates the light into light of a first color and directs it onto the first light modulator and separates out light of a second color and directs it onto the second light modulator, wherein the light modulators modulate the light impinging on them to generate a first partial color image, and a second partial color image and the modulated light is superimposed by the color unit to form one common beam, which impinges on the imaging optics.

13. The projection arrangement as claimed in claim 12, wherein the projection arrangement further comprises a third light modulator arranged following the color unit, said color unit separating out light of a third color from the light impinging on it and directing said light of a third color onto the third light modulator, which modulates the light impinging on it to generate a third partial color image.

14. The projection arrangement as claimed in claim 13, wherein the first light modulator generates a red partial color image, the second light modulator generates a green partial color image and the third light modulator generates a blue partial color image.

15. The projection arrangement as claimed in claim 1, wherein the projection optics only comprise the imaging optics.

16. The projection arrangement as claimed in claim 1, wherein the projection optics further comprise a projection unit arranged following the imaging optics.

17. A method of projecting an image, comprising the steps of:

generating a luminous field with a light source;

directing light from the luminous field only once through a lens in imaging optics onto a reflecting light modulator;

modulating the light by the light modulator to generate an image; passing light from the light modulator through a lens in the imaging optics twice; and reflecting the light off a mirror in the imaging optics.

18. The method as claimed in claim 17, further comprising the step of interposing illumination optics between the luminous field and the lens of the imaging optics.

19. The method as claimed in claim 17, wherein the imaging optics have an optical axis extending through a reference plane and further comprising the step of locating the light modulator on a one side of the reference plane and the image of the light modulator on an opposing side of the reference plane.

20. The method as claimed in claim 19, further comprising the step of locating the luminous field on the same side of the reference plane as the image of the light modulator.

21. The method as claimed in claim 17, further comprising the steps of:

interposing a color unit between the imaging optic and the light modulator;

locating a second light modulator following the color unit;

separating out light of a first color and directing it onto the first light modulator and separating out light of a second color and directing it onto the second light modulator so that the first and second light modulators generate a first and a second partial color image; and combining the first and second partial color images.

22. The method as claimed in claim 21, further comprising the steps of:

locating a third light modulator following the color unit;

separating out light of a third color and directing it onto the third light modulator so that the third modulator generates a third partial color image; and combining the third partial color image with the first and second partial color images.

23. The method as claimed in claim 21, wherein the first partial color image is red, the second partial color image is green and the third partial color image is blue.

* * * * *